July 3, 1928.

C. CHARLIER ET AL

COOKING POT

Filed Nov. 18, 1926

Inventor:
Camille Charlier & Abraham Erera

July 3, 1928. 1,675,640

C. CHARLIER ET AL

COOKING POT

Filed Nov. 18, 1926 3 Sheets-Sheet 2

Patented July 3, 1928.

1,675,640

UNITED STATES PATENT OFFICE.

CAMILLE CHARLIER AND ABRAHAM ERRERA, OF BRUSSELS, BELGIUM.

COOKING POT.

Application filed November 18, 1926, Serial No. 149,156, and in Belgium December 8, 1925.

Heretofore various kinds of pots, pans and digesters have been used in a general way for domestic purposes, the cover of said pots being arranged inwardly and tightened from the inside towards the outside by means of an outwardly arranged locking mechanism so as to secure a tight joint on its entire periphery by the boiling pressure and thus allow quicker, more complete and better cooking.

Our present invention has for its object to provide a cooking pot of this type wherein the locking system of the cover is reduced to the greatest simplicity, whereby the outer appearance of the pot will not be affected and at the same time a perfect closing secured.

A further object of our invention is to provide a cooking pot of the type described, wherein the cover has its periphery provided with a depression cooperating with the slightly bent rim of the opening of the pot so as to secure a completely tight joint, at the same time permitting of the oval shaped cover being quickly and rather automatically put in place.

A still further object of our invention is to provide such a cooking pot, in which the cover is slightly arched inwardly, so that the pressure of steam will be deflected towards the rim of the cover (in order to enhance the tightness of the joint) whilst condensed water will flow towards the centre of the cover and thus be prevented from being inserted into the joint or discharged therethrough.

In the accompanying drawings we have illustrated various forms of the invention:

Figure 1:
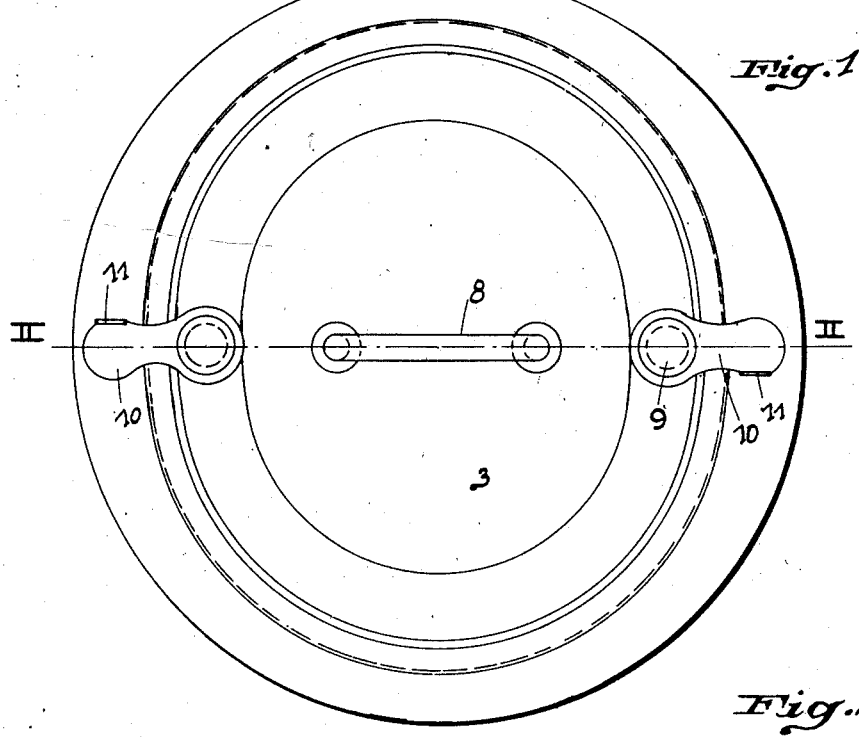
Fig. 1 is a plan view of the closed cooking pot.
Figure 2:
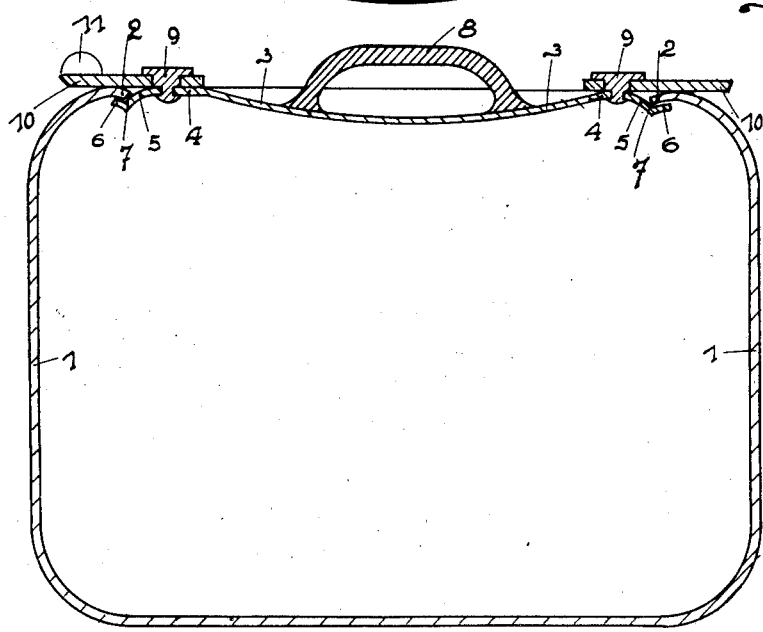
Fig. 2 is a vertical axial section thereof.

The cooking pot 1 made of any desired shape, has an oval opening, the rim 2 of which is slightly bent inwardly as shown in Fig. 2. Combined with this pot is a cover 3 also made oval in shape and somewhat larger than the opening of the pot. In cross and longitudinal section said cover is of the shape shown in Fig. 2, that is its central portion is slightly arched or bulged inwardly, and on each side of this central portion there is a straight portion 4 ending in a bend 5 extended by a slightly raised portion 6 parallel to the inwardly bent rim 2.

In other words the circular portion 4 of the cover ends outwardly into an annular groove 7 corresponding exactly to the rim 2 of the opening of the pot. It will be seen that as the cover is placed inside the pot, it will be sufficient upon raising the same by its handle 8 to press it slightly against the bent rim 2 for having the cover at once in its normal position, the rim 2 overlapping the end 6 of the cover.

Along the small axis of the cover the portion 4 of the latter carries two diametrically opposed pivot-pins 9 for two locking parts 10 provided with thumb-pieces 11 and which when turned into the positions shown, will firmly apply the portion 6 of the cover against the rim 2 of the pot. Owing to the bulged form of the central portion of the cover, the steam generated within the pot will be deflected towards the joint 2—5—6, where it will act to secure an absolutely tight joint.

It will be seen that condensed steam will be collected at the lowermost part of the cover and have no tendency to be forced into the joint 2—5—6.

The cover will be removed in the usual way by grasping the same at the handle, releasing the locking parts 10, and turning the cover half around and inclining it at the same time about its small axis.

The cover will be inserted into the pot by a reverse manipulation.

The cover is preferably provided with a safety-valve, a lead-fuse, an alarm-pipe and the like.

The rim 2 of the cover is slightly higher than the upper face of the portion 4 of the cover, so that the hooks 10 will force the cover sufficiently if they are engaged to hold said cover firmly. Said rim 2 may also be provided with a projection for the same purpose.

However in practice it has been found that with the average thicknesses and dimensions admissible for domestic use, said locking device comprising pivoted hooks or levers is not adapted to secure perfect tightness of the joint owing to the clearance which will soon be formed at the pivot-pin.

Figure 3:
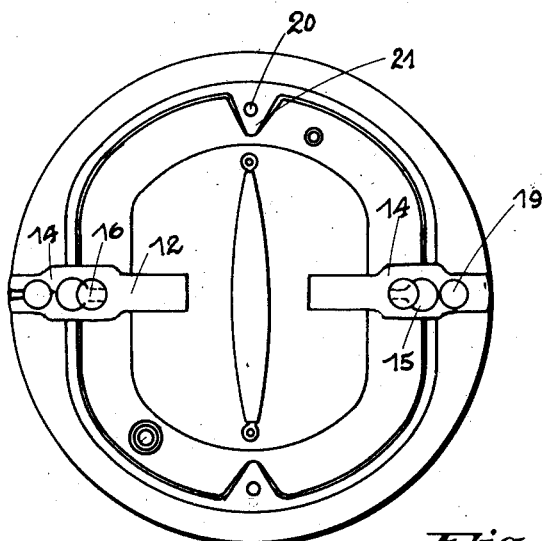
Figs. 3 and 4 are similar views of an alternate form.
Figure 4:
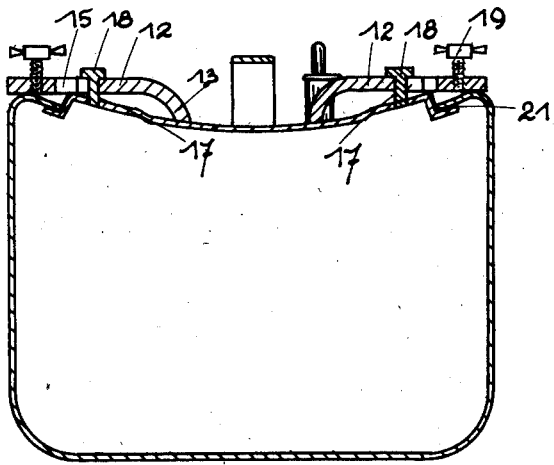

The locking system shown in Figs. 3 and 4 serves to avoid these defects; the same comprises two diametrically opposed pieces of 12, each of which is formed of a flat rod bent to form a nose 13. Each rod 12 is provided with an enlarged portion 14 having a round hole 15 ending into an oblong portion 16. Extending through said hole is the shank of a pin 17 secured to the cover and the diameter of which corresponds to the section of the opening 16, whilst the head 18 corresponds to the diameter of the hole 15. A screw 19 extends through the end of each rod 12.

21 designates an asbestos, card board or felt leaf placed upon the peripherical rim of the cover and held in place by two points 20 secured to the cover.

The cover, after being put into position as usual and held by its handle 8, will be tightened against the rim of the pot by a simple manipulation of the screw 19; it will be sufficient to previously engage the shanks of the pins 17 entirely into the openings 16, the rods 12 being placed into the positions shown. The effect of the tightening of the screws 19 is to force the rods 12 upon the rim of the pot and at the same time upon the concave portion of the cover, thus forming a rigid undistortable closure and locking.

The rods 12 are not pivotable about the pins 17; in order to remove the same, it will be sufficient, after having loosened the screws 19, to push the rods 12 towards the centre of the cover so as to move the pins into the openings 15.

It will be obvious that the same result may be obtained by avoiding the bent portions of the rods 12, whereby the total pressure produced by the screws 19 will be exerted upon the pins 17.

Figure 5:
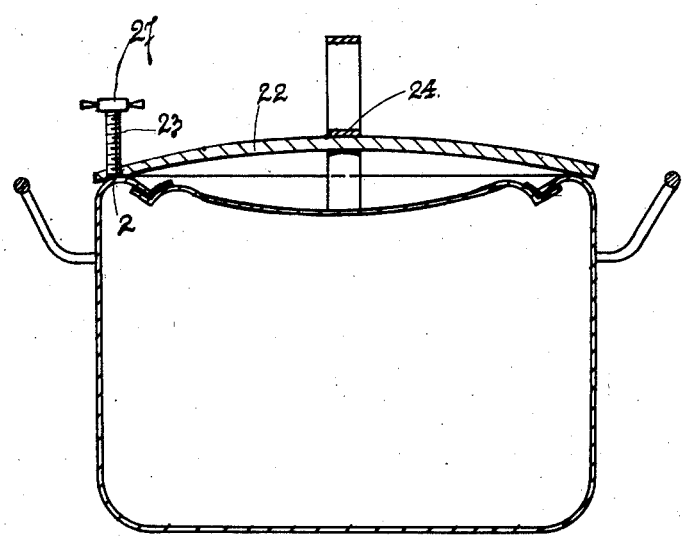
Fig. 5 is a vertical section on the large axis of the cooking pot.
Figure 6:
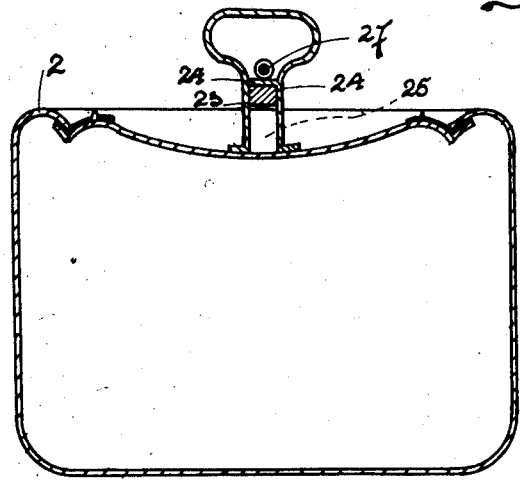
Fig. 6 is a vertical section on the small axis of another form.

In the form shown in Figs. 5 and 6, the handle is formed for instance of a metal blade, both ends of which are soldered or riveted to the central portion of the cover, said blade being curved as shown in Fig. 6. At a certain height, the two branches of the handle are braced by a short metal blade 24 which is firmly secured so as to form a free space 25 between said blade and the upper face of the cover. The locking of the cover is obtained by means of a strong bar 22, preferably arched as shown in Fig. 5; said bar will be inserted into the space 25 and the ends thereof will rest on the upper rim of the pot. Through one end of the bar 22 extends a screw 23 ending into wings or a head 27.

It will be seen that the bar being inserted into the free space 25, the tightening of the screw 23 resting on the rim 2, will determine a progressive and uniform tightening of the cover against the lower face of the rim 2 of the pot. The unlocking will be effected by simply loosening said screw, whereby the bar 22 as well as the cover may be removed.

The height of the space 25 is preferably such that the bar 22 may be inserted without trouble, at the same time requiring a simple turn of the screw only to lock the joint between the cover and rim 2.

Having now fully described our said invention, what we claim and desire to secure by Letters Patent, is:

1. In a cooking pot, the combination with the pot and an inwardly arched cover of oval shape intended to be inserted into the pot and tightened upwardly against the upper rim or flange of the pot, of a flange formed around the opening of the pot and slightly bent downwardly and inwardly, and an annular groove formed in the rim of the cover, the outer wall of the groove being inclined downwardly, the flange fitting in the groove with the edge thereof engaging the downwardly inclined wall.

2. In a cooking pot, the combination with the pot and an inwardly arched cover of oval shape intended to be inserted into the pot and tightened upwardly against the upper rim or flange of the pot, of a flange formed around the opening of the pot and slightly bent downwardly and inwardly, and an annular groove formed in the rim of the cover, the outer wall of the groove being inclined downwardly, the flange fitting in the groove with the edge thereof engaging the downwardly inclined wall, the arch of the cover extending substantially throughout the full area thereof inwardly of said groove, whereby the interior pressure incident to the heating of the contents of the pot serves to tighten the cover in place in direct protection to such pressure.

3. In a cooking pot, the combination with the pot and an inwardly arched cover of oval shape intended to be inserted into the pot and tightened upwardly against the upper rim or flange of the pot, of a flange formed around the opening of the pot and slightly bent downwardly and inwardly, and an annular groove formed in the rim of the cover, the outer wall of the groove being inclined downwardly, the flange fitting in the groove with the edge thereof engaging the downwardly inclined wall, and means whereby the cover may be secured against inward movement relative to the cooking pot.

In testimony whereof we have hereunto set our hands.

CAMILLE CHARLIER.
ABRAHAM ERRERA.